United States Patent
Chen et al.

(10) Patent No.: US 11,205,984 B1
(45) Date of Patent: Dec. 21, 2021

(54) MOTOR DRIVING CIRCUIT AND MOTOR DRIVING METHOD

(71) Applicant: ANPEC ELECTRONICS CORPORATION, Hsinchu (TW)

(72) Inventors: Kun-Min Chen, Hsinchu (TW); Yi-Cheng Liu, New Taipei (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 17/037,950

(22) Filed: Sep. 30, 2020

(30) Foreign Application Priority Data

Aug. 27, 2020 (TW) .................................. 109129253

(51) Int. Cl.
*H02P 23/14* (2006.01)
*H02P 1/46* (2006.01)
*H02P 25/03* (2016.01)

(52) U.S. Cl.
CPC ................ *H02P 23/14* (2013.01); *H02P 1/46* (2013.01); *H02P 25/03* (2016.02)

(58) Field of Classification Search
CPC ............ H02P 23/14; H02P 25/03; H02P 1/46
USPC ........................ 318/400.32–400.36
See application file for complete search history.

(56) References Cited

U.S. PATENT DOCUMENTS

| | | | | |
|---|---|---|---|---|
| 5,223,772 A * | 6/1993 | Carobolante | ............. | H02P 6/21 318/400.13 |
| 5,929,577 A * | 7/1999 | Neidorff | ................. | H02P 6/182 318/400.35 |
| 6,433,496 B1 * | 8/2002 | Kawagoshi | ............. | H02P 6/085 318/145 |
| 6,512,342 B2 * | 1/2003 | Kawagoshi | ............... | H02P 6/21 318/400.1 |
| 8,310,190 B2 * | 11/2012 | Hsu | ...................... | H02P 29/0241 318/400.32 |
| 8,933,657 B2 * | 1/2015 | Wang | ........................ | H02P 6/20 318/400.06 |
| 2014/0111168 A1 * | 4/2014 | Chen | .................... | H02M 3/1588 323/235 |

* cited by examiner

*Primary Examiner* — Rina I Duda
(74) *Attorney, Agent, or Firm* — Li & Cai Intellectual Property (USA) Office

(57) ABSTRACT

A motor driving circuit and a motor driving method are provided. The motor driving circuit is used to drive a motor, and includes a starting unit, a driving unit, a floating phase selecting unit, a hysteresis comparator, an integration circuit, a first comparator and a control circuit. The control circuit controls the floating phase selecting unit to select a floating phase to output a floating phase voltage signal, and controls, in response to an initial starting signal, the integration circuit to use a first integration time, and determine whether the motor has been successfully started. In response to a successful start, the control circuit controls the integration circuit to use a second integration time, and controls the starting unit to be switched to an operation mode to control the driving unit to drive the motor. The first integration time is greater than the second integration time.

10 Claims, 4 Drawing Sheets

MOTOR DRIVING CIRCUIT AND MOTOR DRIVING METHOD

CROSS-REFERENCE TO RELATED PATENT APPLICATION

This application claims the benefit of priority to Taiwan Patent Application No. 109129253, filed on Aug. 27, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor driving device and a motor driving method, and more particularly to a motor driving device and a motor driving method capable of reducing noise interference.

BACKGROUND OF THE DISCLOSURE

Direct current (DC) brushless motors are common motors having advantages of having high efficiency, being lightweight, thin, short, and small in size, thus the DC brushless motors are widely used in various fields, such as in existing electronic products (e.g., personal computers, notebook computers, communication devices and household appliances). For example, fan motors for various electronic products and spindle motors for computer storage devices utilize DC brushless motors. In general, when driving a DC brushless motor, a position of a rotor of the motor must be detected to properly drive commutation switches for performing a commutation procedure.

An existing brushless DC motor system typically includes a three-phase brushless DC motor, a Hall sensor, and a driver. However, since the Hall sensor is easily affected by the external environment, the sensing accuracy may be reduced, and may even result in malfunctioning in some environments (e.g., an environment with an excessive temperature). On the other hand, the brushless DC motor system further includes the Hall sensor, and a volume of the system and manufacturing costs are therefore increased. Therefore, a sensorless driving method without using a sensor has been further provided.

In an existing sensorless driving method, after the motor is driven in an open circuit configuration, an excitation phase is set to drive the rotor of the motor to a certain position, and a commutation time and the corresponding shortening speed is then set, thereby speeding up the commutation of the motor until a rotation speed of the motor reaches a certain set speed, and then entering a closed loop mode for driving.

In the above method, it is necessary to detect zero points of back EMF to detect a correct commutation point. However, when detecting the zero point of the back-EMF, noise will cause voltage disturbances, which will result in a fault detection of the position of the zero-point of the back-EMF, resulting in an error in the commutation point and the motor cannot be started or driven correctly.

Therefore, there is an urgent need for a motor driving device and a method that can reduce noise interference.

SUMMARY OF THE DISCLOSURE

In response to the above-referenced technical inadequacies, the present disclosure provides a motor driving circuit and a motor driving method that can reduce noise interference.

In one aspect, the present disclosure provides a motor driving device for driving a motor, and the motor driving device includes a starting unit, a driving unit, a floating phase selecting unit, a hysteresis comparator, an integration circuit, a first comparator and a control circuit. The starting unit is configured to switch between a starting mode and an operation mode. In the starting mode, the starting unit generates an initial starting signal having a plurality of phases. The driving unit is coupled to the starting unit and the motor, and configured to drive the motor with the initial starting signal. The floating phase selecting unit is coupled to the driving unit and the motor, and configured to select a floating phase of the motor according to a driving condition of the driving unit, and output a floating phase voltage signal. The hysteresis comparator is configured to compare the floating phase voltage signal with a neutral point voltage signal corresponding to the motor to output a comparison result signal. In response to a difference between a voltage of the floating phase voltage signal and a voltage of the neutral point voltage signal exceeding a positive value of a hysteresis voltage, the hysteresis comparator outputs the comparison result signal with a first level, and in response to the difference between the voltage of the floating phase voltage signal and the voltage of the neutral point voltage signal exceeding a negative value of the hysteresis voltage, the hysteresis comparator outputs the comparison result signal with a second level. The integration circuit is configured to count the comparison result signal within an integration time to generate an integration result value, and correspondingly output an integration result signal. The first comparator is configured to compare the integration result signal with a preset reference signal and correspondingly output a commutation signal, and the driving unit further drives the motor with the initial starting signal according to the commutation signal. and The control circuit is configured to control the integration circuit to use a first integration time as the integration time in response to the initial starting signal, and determine whether or not the motor has been successfully started, and in response to the motor having been successfully started, the control circuit is configured to control the integration circuit to use a second integration time as the integration time, and control the starting unit to switch to the operation mode to output an operation signal to control the driving unit to drive the motor. The first integration time is greater than the second integration time.

In some embodiments, the motor driving circuit further includes a rotation speed detecting unit configured to detect a rotation speed of the motor and correspondingly output a rotation speed signal, and the control unit controls the second integration time to decrease as the rotation speed increases according to the rotation speed indicated by the rotation speed signal in the operation mode.

In some embodiments, the integration circuit includes a first current source, a first switch, a variable capacitor, a second switch, a second current source, and a second comparator. The first switch is connected between the first current source and an integration node, the variable capacitor is connected between the integration node and a ground terminal, the second switch is connected between the integration node and another ground terminal, the second current source is connected between the second switch and the another ground terminal, the second comparator is configured to compare an integration voltage of the integration node with a reference voltage, and correspondingly output the integration result signal, the control circuit is configured to control magnitudes of the variable capacitor, the first current source, the second current source, or the reference voltage to control the integration time, and the first switch and the second switch are turned on and off based on the comparison result signal.

In some embodiments, the integration circuit is an up-down counter having a clock terminal, an input terminal and an output terminal. The control circuit is configured to control a counting speed of the up-down counter through the clock terminal to control the integration time, and the up-down counter is configured to receive the comparison result signal through the input terminal and perform counting to generate the integration result value, and output the integration result signal at the output terminal.

In some embodiments, the second integration time is fixed.

In another aspect, the present disclosure provides a motor driving method for driving a motor, the method includes: configuring a starting unit to enter a starting mode, in which the starting unit is switched between the starting mode and an operation mode and the starting unit generates an initial starting signal having a plurality of phases in the starting mode; configuring a driving unit to drive the motor with the initial starting signal; configuring a floating phase selecting unit to select a floating phase of the motor according to a driving condition of the driving unit, and output a floating phase voltage signal; configuring a hysteresis comparator to compare the floating phase voltage signal with a neutral point voltage signal corresponding to the motor to output a comparison result signal, in which in response to a difference between a voltage of the floating phase voltage signal and a voltage of the neutral point voltage signal exceeding a positive value of a hysteresis voltage, the hysteresis comparator outputs the comparison result signal with a first level, and in response to the difference between the voltage of the floating phase voltage signal and the voltage of the neutral point voltage signal exceeding a negative value of the hysteresis voltage, the hysteresis comparator outputs the comparison result signal with a second level; configuring an integration circuit to count the comparison result signal within an integration time to generate an integration result value, and correspondingly output an integration result signal; configuring a comparator to compare the integration result signal with a preset reference signal and correspondingly output a commutation signal, in which the driving unit further drives the motor with the initial starting signal according to the commutation signal; configuring a control circuit to control the floating phase selecting unit to select the floating phase of the motor to output the floating phase voltage signal, and to control the integration time of the integration circuit; configuring the control circuit to control the integration circuit to use a first integration time as the integration time in response to the initial starting signal, and determine whether or not the motor has been successfully started; configuring the control circuit to, in response to the motor having been successfully started, control the integration circuit to use a second integration time as the integration time, and control the starting unit to switch to the operation mode to output an operation signal to control the driving unit to drive the motor. The first integration time is greater than the second integration time.

Therefore, the motor driving circuit and the method provided by the present disclosure averages the comparison result of the floating phase voltage signal and the neutral point voltage signal through the integrating circuit, such that false detection of the position of the commutation point caused by noise can be avoided. In addition, by using the control circuit to control duration of the integration time, the position of the commutation point can be ensured to be detected at various speeds immediately without precisely modulating the integration time, thereby saving manufacturing costs.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
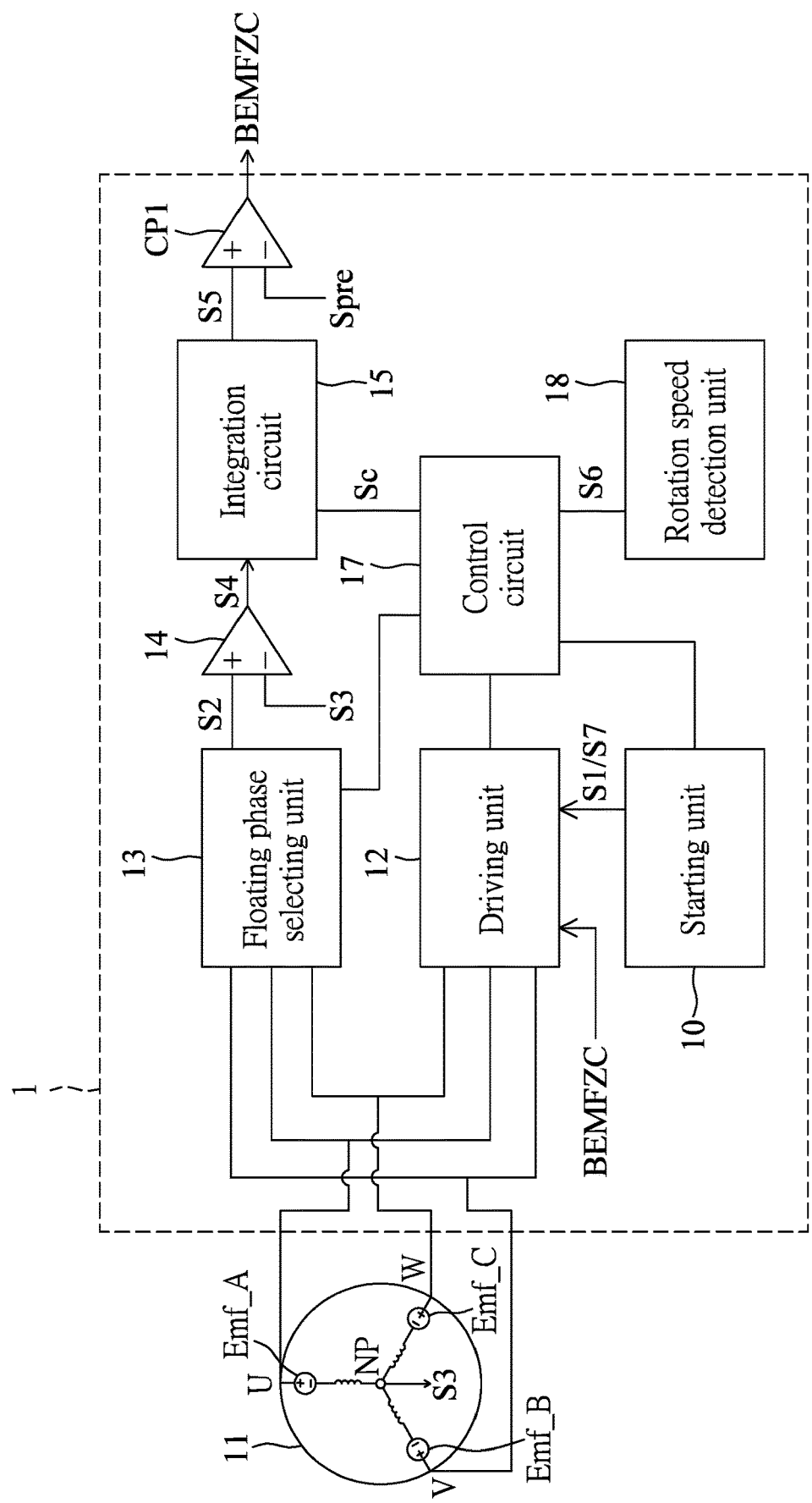
FIG. 1 is a circuit schematic diagram of a motor driving device according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
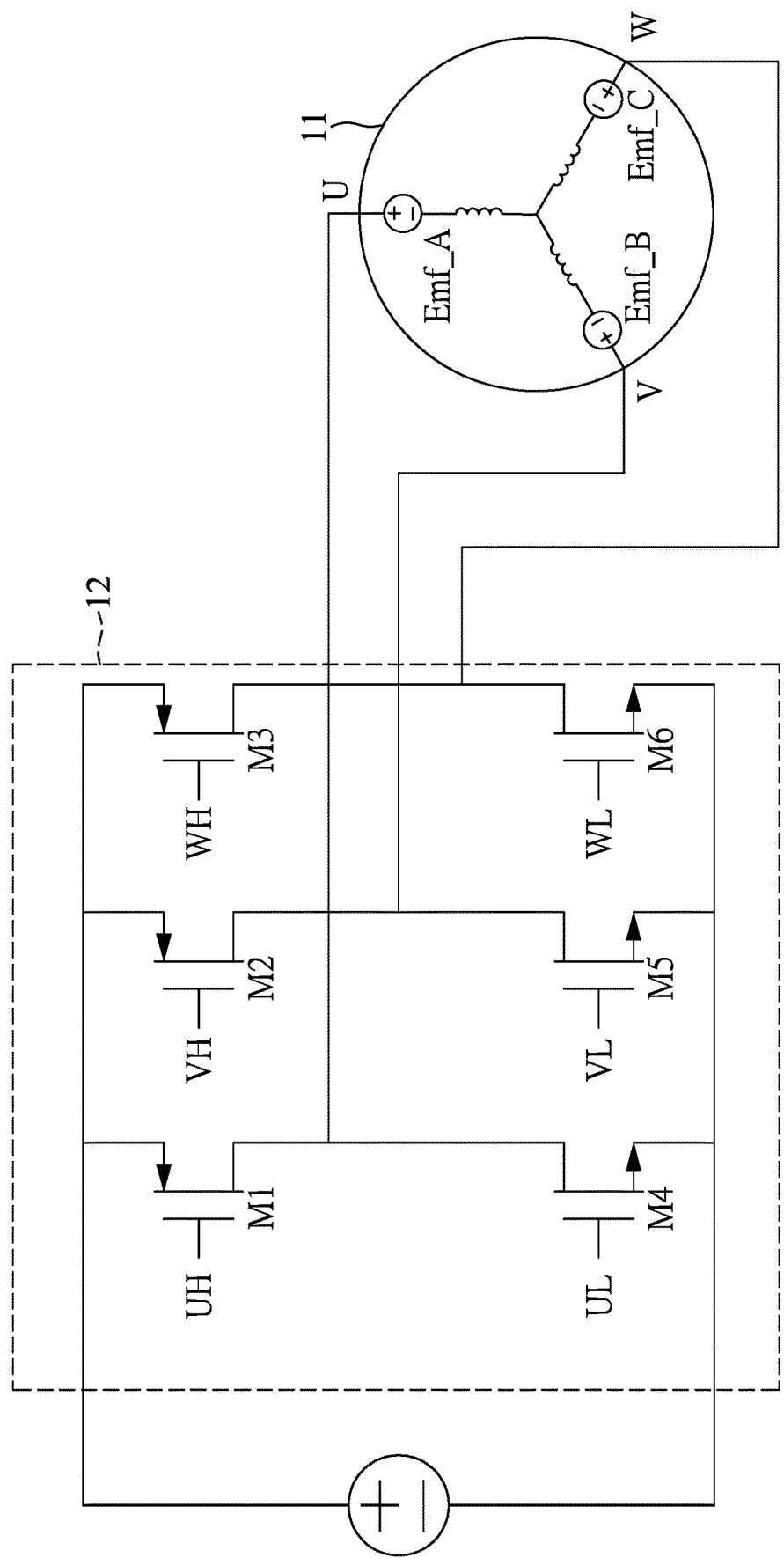
FIG. 2 is a circuit schematic diagram of a motor and a driving unit according to an embodiment of the present disclosure.

Reference is made to FIGS. 1 and 2. FIG. 1 is a circuit schematic diagram of a motor driving device according to an embodiment of the present disclosure, and FIG. 2 is a circuit schematic diagram of a motor and a driving unit according to an embodiment of the present disclosure.

Referring to FIG. 1, an embodiment of the present disclosure provides a motor driving circuit 1 for driving a motor 11, the motor driving circuit 1 includes a starting unit 10, a driving unit 12, a floating phase selecting unit 13, a hysteresis comparator 14, an integration circuit 15, a first comparator CP1 and a control circuit 17. The motor 11 can be a three-phase sensorless DC motor.

The starting unit 10 is switchable between a starting mode and an operation mode. In the starting mode, the starting unit 10 generates an initial starting signal S1 having a plurality of phases, and a commutation sequence is set according to a predetermined rotation direction of the motor 11.

As shown in FIG. 2, the driving unit 12 is coupled to the starting unit 10 and the motor 11, and is configured to drive the motor 11 with phases indicated in the initial starting signal S1. The driving unit 12 can receive the initial starting signal S1 to output switch signals UH, UL, VH, VL, WH, and WL to control the on or off state of each switch unit in the driving unit 12.

In general, the motor 11 has three windings, which are a U coil winding U, a V coil winding V, and a W coil winding W. As can be seen from circuit architecture of FIG. 2, the driving unit 12 includes transistors M1, M2, M3, M4, M5, and M6. When the transistor M1 and the transistor M5 are turned on, a current of the motor 11 is operated by a power source through the transistor M1. The current for driving the motor 11 flows from the power supply terminal, through the transistor M1, the U coil winding U, and the V coil winding V of the motor 11, and then flows to the ground terminal through the transistor M5.

Generally, the currents for controlling a normal motor flow from the U coil winding U to the V coil winding V, the U coil winding U to the W coil winding W, and then changes a direction of the currents to flow from the U coil winding U to the W coil winding W, from the V coil winding V to the W coil winding W, from the V coil winding V to the U coil winding U, and then V coil winding V to the W coil winding W. Next, other phase changes continuously control the flow direction of the current of the U coil winding U, the V coil winding V, and the W coil winding W, thereby controlling the rotation direction of the motor. A phase change of the motor is described in the above embodiment, however, this is only one kind of a motor phase changing control, other phase changing methods of the motor will not be described herein.

Furthermore, the commutation sequence can be, for example, sequentially arranged in UV, UW, VW, VU, WU, and WV. When the U coil winding U serves as the floating phase, a BEMF generated thereby is Emf A, when the V coil winding V serves as the floating phase, a BEMF generated thereby is Emf B, and when the W coil winding W serves as the floating phase, a BEMF generated thereby is Emf C.

Furthermore, the floating phase selecting unit 13 is coupled to the driving unit 12 and the motor 11, and is configured to select the floating phase of the motor 11 that is not turned on according to a driving condition of the driving unit 12, and output a floating phase voltage signal S2. For example, in a case of UV in the commutation sequence, that is, the U coil winding U and the V coil winding V are turned on, and at this time, the floating phase that is not turned on in the motor 11 is the W coil winding W. In a case of UW in the commutation sequence, that is, the U coil winding U and the W coil winding W are turned on, and at this time, the floating phase that is not turned on in the motor 11 is the V coil winding V. In this embodiment, the floating phase selecting unit 13 can be, for example, a multiplexer.

In addition, the motor driving circuit 1 further includes a hysteresis comparator 14 configured to compare the floating phase voltage signal S2 with a neutral point voltage signal S3 corresponding to the motor 11 to output a comparison result signal S4. In detail, as shown in FIG. 1, the neutral point voltage signal S3 from a neutral point NP of the motor 11 can be directly obtained, or a network with three resistors can be used in parallel with three windings of the motor 11 to generate a virtual neutral point, and the floating phase voltage signal S2 can be further compared with the neutral point voltage signal S3 from the virtual neutral point.

It should be noted that the hysteresis comparator 14 has a hysteresis voltage VHS. In response to a difference between a voltage of the floating phase voltage signal S2 and a voltage of the neutral point voltage signal S3 exceeding a positive value of the hysteresis voltage VHS, the hysteresis comparator 14 outputs the comparison result signal S4 with a first level, and in response to the difference between the voltage of the floating phase voltage signal S2 and the voltage of the neutral point voltage signal S3 exceeding a negative value of the hysteresis voltage VHS, the hysteresis comparator 14 outputs the comparison result signal S4 with a second level.

Specifically, when the voltage difference between the floating phase voltage signal S2 and the neutral point voltage signal S3 is greater than the positive value of the hysteresis voltage VHS, the comparison result signal S4 can be at a high potential. When the voltage difference between the floating phase voltage signal S2 and the neutral point voltage signals S3 is less than the negative value of the hysteresis voltage VHS, the comparison result signal S4 is at a low potential.

In the above embodiment, the comparison between the floating phase voltage signal S2 and the neutral point voltage signal S3 is essentially to detect a zero point of the back electromotive force to detect a correct commutation point. However, although the hysteresis voltage VHS has been used to provide a buffer range to reduce an influence of noise on the BEMF when detecting the zero point of the BEMF, there is still a chance that the BEMF may cause voltage disturbances due to the noise, which may cause false detection of the position of the zero point of the BEMF, which in turn causes the commutation point to be incorrect and the motor cannot be started or driven correctly. Therefore, the motor driving circuit of the present disclosure further uses an integration circuit to detect an averaged BEMF.

Reference is made back to FIG. 1, the motor driving circuit 1 further includes an integration circuit 15 configured to count the comparison result signal S4 within an integration time to generate an integration result value, and correspondingly output an integration result signal S5. In this embodiment, the integration circuit 15 is used to overcome the noise to obtain high or low potential output of the averaged BEMF, thereby preventing the noise from causing misjudgment of the BEMF. The details of the integration circuit 15 will be described hereinafter. Thereafter, taking a three-phase sensorless motor as an example, the high and low potentials of the BEMF voltage of the floating phase are detected by using three phases of six steps as a cycle, the purpose of which is to make the commutation point to be closer to a zero point of the BEMF by detecting the voltage level of the BEMF of the floating phase, so as to properly start the motor 11, and the motor 11 can then enter the operation mode after the motor 11 is stabilized.

The first comparator CP1 is configured to compare the integration result signal S5 with a preset reference signal Spre, and correspondingly output a commutation signal BEMFZC, such that the driving unit 12 can drive the motor 11 with the plurality of phases indicated by the initial starting signal S1 according to the commutation point indicated by the commutation signal BEMFZC.

The control circuit 17 is configured to control the floating phase selecting unit 13 to select a floating phase of the motor 11 to output the floating phase voltage signal S2. In other words, the floating phase of the motor 11 is a non-conducting phase circuit, and the control circuit 17 is further configured to control the integration time of the integration circuit 15.

When the starting unit 10 outputs the initial starting signal S1, the control circuit 17 controls the integration circuit 15 to use the first integration time as the integration time in response to the initial starting signal S1. At the same time, the control circuit 17 can determine whether or not the motor 11 has been successfully started. As shown in FIG. 1, the motor driving circuit 11 further includes a rotation speed detecting unit 18 for detecting a rotation speed of the motor 11 and correspondingly outputting a rotation speed signal S6. The control circuit 17 can determine whether or not the motor 11 has been successfully started according to the motor speed indicated by the rotation speed signal S6. For example, when the motor speed indicated by the speed signal S6 becomes stable, it means the start has been successful.

In response to the successful start of the motor 11, the control circuit 17 further controls the integration circuit 15 to use a second integration time as the integration time, and controls the starting unit 12 to switch to the operation mode to output an operation signal S7 to control the driving unit 12 to drive the motor 11.

It should be noted that in the start mode, since the motor 11 rotates slowly, a larger first integration time can be used, and in the operation mode, in order to make the detection of the commutation point meet the requirements of the rotation speed, smaller second integration time can be used. Generally speaking, the first integration time is greater than the second integration time.

Figures 3A, 3B:
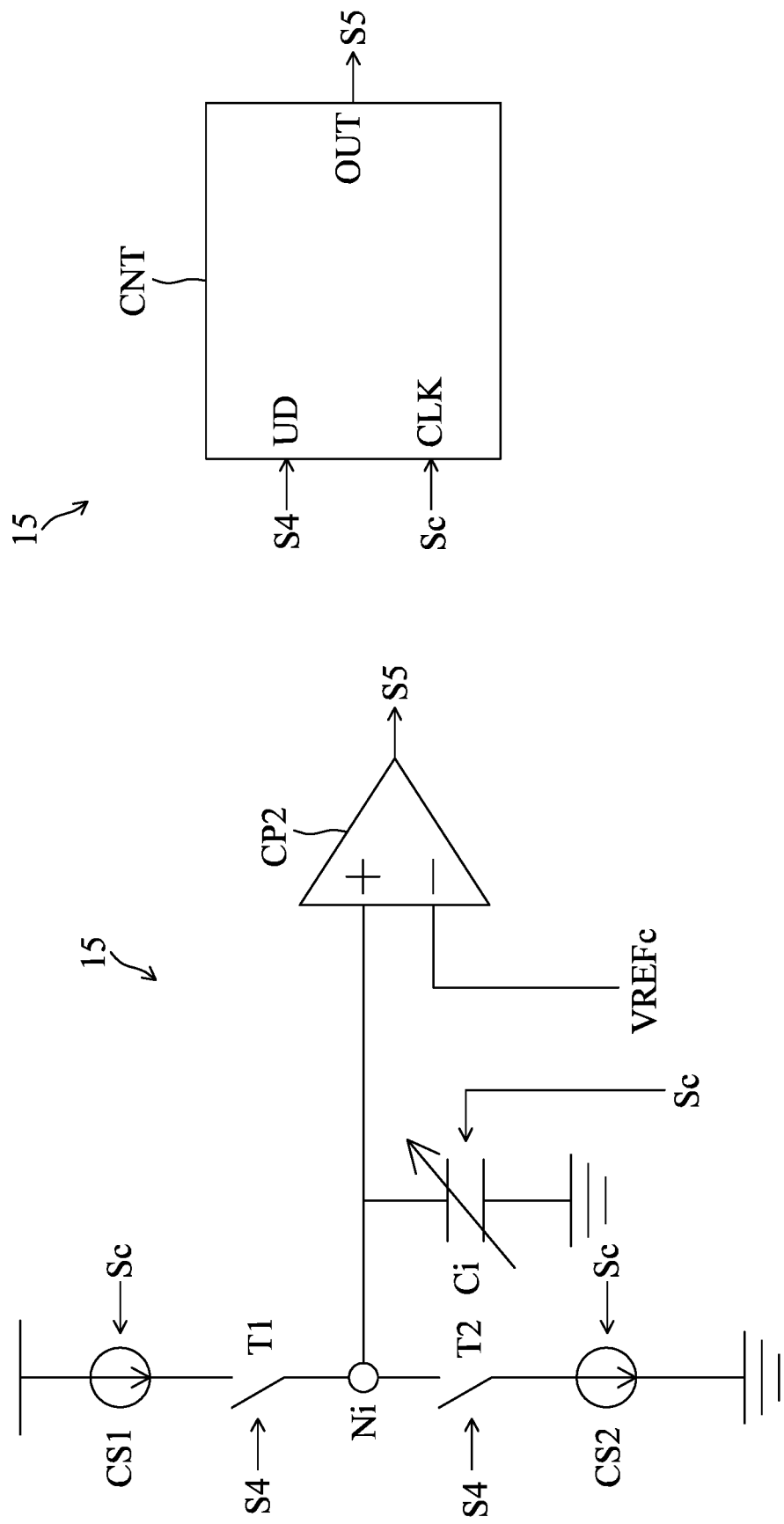
FIGS. 3A and 3B are circuit diagrams of integration circuits according to an embodiment and another embodiment of the present disclosure, respectively.

Reference is made to FIGS. 3A and 3B. FIGS. 3A and 3B are circuit diagrams of integrating circuits according to an embodiment and another embodiment of the present disclosure, respectively.

As shown in FIG. 3A, the integration circuit 15 can include a first current source CS1, a first switch T1, a variable capacitor Ci, a second switch T2, a second current source CS2, and a second comparator CP2. The first switch T1 is connected between the first current source CS1 and an integration node Ni, the variable capacitor Ci is connected between the integration node Ni and a ground terminal, the second switch T2 is connected between the integration node Ni and another ground terminal, and the second current source CS2 is connected between the second switch T2 and the another ground terminal.

In this embodiment, the second comparator CP2 is configured to compare an integration voltage of the integration node Ni with a reference voltage VREFc, and correspondingly output the integration result signal S5. The control circuit 17 can control magnitude of the variable capacitor Ci, the first current source CS1, the second current source CS2 or the reference voltage VREFc through the control signal Sc to control the integration time used by the integration circuit 15. On the other hand, the first switch T1 and the second switch T2 are respectively switched between on and off states according to the comparison result signal S4. For example, when the comparison result signal S4 is at a high potential, the first switch T1 is turned on and the second switch T2 is turned off, and the first current source CS1 can charge the variable capacitor Ci until the voltage of the integration node Ni reaches the reference voltage VREFc, the second comparator CP2 can output a high potential. The speed at which the voltage of the integration node Ni reaches the reference voltage VREFc can depend on the magnitude of the variable capacitor Ci, the first current source CS1 or the reference voltage VREFc controlled by the control circuit 17.

Similarly, when the comparison result signal S4 is at a low potential, the first switch T1 is turned off and the second switch T2 is turned on, and the variable capacitor Ci is discharged. A discharge speed can also depend on the magnitude of the variable capacitor Ci, the second current source CS1 or the reference voltage VREFc controlled by the control circuit 17.

In another embodiment as shown in FIG. 3B, the integration circuit 15 may be an up-down counter CNT, which has a clock terminal CLK, an input terminal UD, and an output terminal OUT. The control circuit 17 can control a counting speed of the up-down counter CNT by inputting a control signal Sc into the clock terminal CLK, and then control the integration time to be the aforementioned first integration time or the second integration time. The up-down counter CNT is configured to receive the comparison result signal S4 through the input terminal UD and perform counting to generate the integration result value, and output the integration result signal S5 at the output terminal OUT.

In some embodiments, when the control unit 17 enters the operation mode in response to the successful start of the motor 11, the control unit 17 can further control the second integration time to decrease as the rotation speed increases according to the motor rotation speed indicated by the rotation speed signal S6 in the operation mode. Alternatively, in the operation mode, the second integration time may be fixed in another embodiment.

Figure 4:
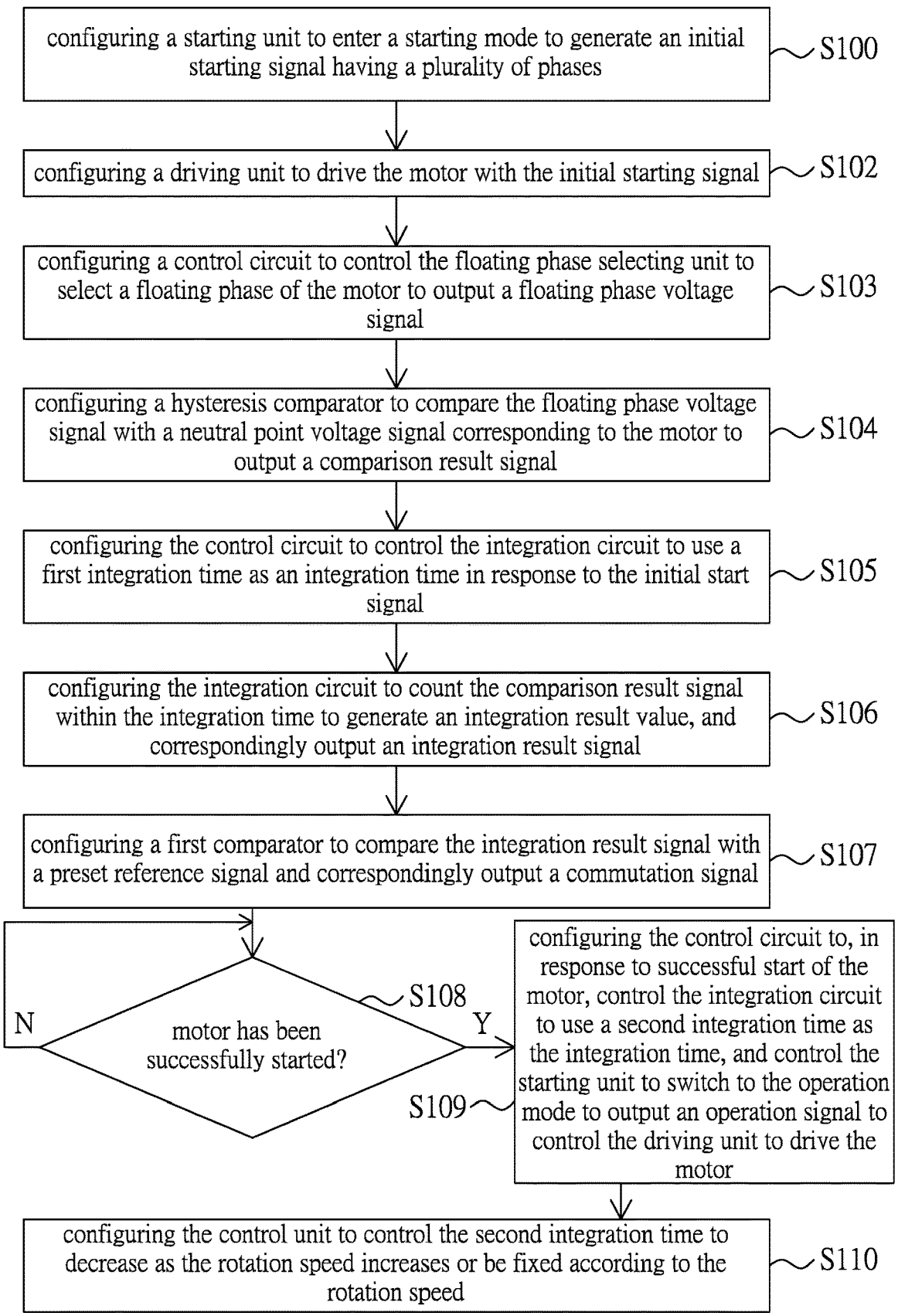
FIG. 4 is a flowchart of a motor driving method according to an embodiment of the present disclosure.

Reference is further made to FIG. 4, which is a flowchart of a motor driving method according to an embodiment of the present disclosure. The motor driving method provided by the present disclosure can be applied to the motor driving circuit 1 shown in FIGS. 1 to 3B, but the present disclosure is not limited thereto.

As shown in FIG. 4, the present disclosure provides a motor driving method for driving a motor, which includes the following steps:

Step S100: configuring a starting unit to enter a starting mode to generate an initial starting signal having a plurality of phases. The starting unit is switched between the starting mode and an operation mode.

Step S102: configuring a driving unit to drive the motor with the initial starting signal.

Step S103: configuring a control circuit to control the floating phase selecting unit to select a floating phase of the motor to output a floating phase voltage signal.

Step S104: configuring a hysteresis comparator to compare the floating phase voltage signal with a neutral point voltage signal corresponding to the motor to output a comparison result signal. In response to a difference between a voltage of the floating phase voltage signal and a voltage of the neutral point voltage signal exceeding a positive value of a hysteresis voltage, the hysteresis comparator outputs the comparison result signal with a first level, and in response the difference between the voltage of the floating phase voltage signal and the voltage of the neutral point voltage signal exceeding a negative value of the hysteresis voltage, the hysteresis comparator outputs the comparison result signal with a second level.

Step S105: configuring the control circuit to control the integration circuit to use a first integration time as an integration time in response to the initial starting signal.

Step S106: configuring the integration circuit to count the comparison result signal within the integration time to generate an integration result value, and correspondingly output an integration result signal.

Step S107: configuring a first comparator to compare the integration result signal with a preset reference signal and correspondingly output a commutation signal. The driving unit further drives the motor with an initial starting signal according to the commutation signal.

Step S108: configuring the control circuit to determine whether or not the motor has been successfully started.

Step S109: configuring the control circuit to, in response to successful start of the motor, control the integration circuit to use a second integration time as the integration time, and control the starting unit to switch to the operation mode to output an operation signal to control the driving unit to drive the motor. The first integration time is greater than the second integration time.

In step S108, if the motor has not been successfully started, the method continuously executes step S108 until the motor is successfully started, and then the method proceeds to step S109.

Step S110: configuring the control unit to control the second integration time to decrease as the rotation speed increases or be fixed according to the rotation speed indicated by the rotation speed signal.

In conclusion, the motor driving circuit and the method provided by the present disclosure averages the comparison result of the floating phase voltage signal and the neutral point voltage signal through the integrating circuit, such that false detection of the position of the commutation point caused by noise can be avoided. In addition, by using the control circuit to control duration of the integration time, the position of the commutation point can be ensured to be detected at various speeds immediately without precisely modulating the integration time, thereby saving manufacturing costs.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A motor driving circuit for driving a motor, comprising:
    a starting unit configured to switch between a starting mode and an operation mode, wherein in the starting mode, the starting unit generates an initial starting signal having a plurality of phases;
    a driving unit coupled to the starting unit and the motor, and configured to drive the motor with the initial starting signal;
    a floating phase selecting unit coupled to the driving unit and the motor, and configured to select a floating phase of the motor according to a driving condition of the driving unit, and output a floating phase voltage signal;
    a hysteresis comparator configured to compare the floating phase voltage signal with a neutral point voltage signal corresponding to the motor to output a comparison result signal, wherein in response to a difference between a voltage of the floating phase voltage signal and a voltage of the neutral point voltage signal exceeding a positive value of a hysteresis voltage, the hysteresis comparator outputs the comparison result signal with a first level, and in response to the difference between the voltage of the floating phase voltage signal and the voltage of the neutral point voltage signal exceeding a negative value of the hysteresis voltage, the hysteresis comparator outputs the comparison result signal with a second level;
    an integration circuit configured to count the comparison result signal within an integration time to generate an integration result value, and correspondingly output an integration result signal;
    a first comparator configured to compare the integration result signal with a preset reference signal and correspondingly output a commutation signal, wherein the driving unit further drives the motor with the initial starting signal according to the commutation signal; and
    a control circuit configured to control the floating phase selecting unit to select the floating phase of the motor to output the floating phase voltage signal, and to control the integration time of the integration circuit,
    wherein the control circuit is configured to control the integration circuit to use a first integration time as the integration time in response to the initial starting signal, and determine whether or not the motor has been successfully started, and in response to the motor having been successfully started, the control circuit is configured to control the integration circuit to use a second integration time as the integration time, and control the starting unit to switch to the operation mode to output an operation signal to control the driving unit to drive the motor,
    wherein the first integration time is greater than the second integration time.

2. The motor driving circuit according to claim 1, further comprising a rotation speed detecting unit configured to detect a rotation speed of the motor and correspondingly output a rotation speed signal, and the control unit controls the second integration time to decrease as the rotation speed increases according to the rotation speed indicated by the rotation speed signal in the operation mode.

3. The motor driving circuit according to claim 1, wherein the integration circuit includes:
    a first current source;
    a first switch connected between the first current source and an integration node;
    a variable capacitor connected between the integration node and a ground terminal;

a second switch connected between the integration node and another ground terminal;

a second current source connected between the second switch and the another ground terminal; and a second comparator configured to compare an integration voltage of the integration node with a reference voltage, and correspondingly output the integration result signal, wherein the control circuit is configured to control magnitudes of the variable capacitor, the first current source, the second current source, or the reference voltage to control the integration time, and the first switch and the second switch are turned on and off based on the comparison result signal.

4. The motor driving circuit according to claim 1, wherein the integration circuit is an up-down counter having a clock terminal, an input terminal and an output terminal, and wherein the control circuit is configured to control a counting speed of the up-down counter through the clock terminal to control the integration time, and the up-down counter is configured to receive the comparison result signal through the input terminal and perform counting to generate the integration result value, and output the integration result signal at the output terminal.

5. The motor driving circuit according to claim 1, wherein the second integration time is fixed.

6. A motor driving method for driving a motor, comprising:

configuring a starting unit to enter a starting mode, wherein the starting unit is switched between the starting mode and an operation mode, and the starting unit generates an initial starting signal having a plurality of phases in the starting mode;

configuring a driving unit to drive the motor with the initial starting signal;

configuring a floating phase selecting unit to select a floating phase of the motor according to a driving condition of the driving unit, and output a floating phase voltage signal;

configuring a hysteresis comparator to compare the floating phase voltage signal with a neutral point voltage signal corresponding to the motor to output a comparison result signal, wherein in response to a difference between a voltage of the floating phase voltage signal and a voltage of the neutral point voltage signal exceeding a positive value of a hysteresis voltage, the hysteresis comparator outputs the comparison result signal with a first level, and in response to the difference between the voltage of the floating phase voltage signal and the voltage of the neutral point voltage signal exceeding a negative value of the hysteresis voltage, the hysteresis comparator outputs the comparison result signal with a second level;

configuring an integration circuit to count the comparison result signal within an integration time to generate an integration result value, and correspondingly output an integration result signal;

configuring a comparator to compare the integration result signal with a preset reference signal and correspondingly output a commutation signal, wherein the driving unit further drives the motor with the initial starting signal according to the commutation signal;

configuring a control circuit to control the floating phase selecting unit to select the floating phase of the motor to output the floating phase voltage signal, and to control the integration time of the integration circuit;

configuring the control circuit to control the integration circuit to use a first integration time as the integration time in response to the initial starting signal, and determine whether or not the motor has been successfully started; and configuring the control circuit to, in response to the motor having been successfully started, control the integration circuit to use a second integration time as the integration time, and control the starting unit to switch to the operation mode to output an operation signal to control the driving unit to drive the motor, wherein the first integration time is greater than the second integration time.

7. The motor driving method according to claim 6, further comprising:

configuring a rotation speed detecting unit to detect a rotation speed of the motor and correspondingly output a rotation speed signal; and configuring the control unit to control the second integration time to decrease as the rotation speed increases according to the rotation speed indicated by the rotation speed signal in the operation mode.

8. The motor driving method according to claim 6, wherein the integration circuit includes:

a first current source;

a first switch connected between the first current source and a first node;

a variable capacitor connected between the first node and a ground terminal;

a second switch connected between the first node and another ground terminal;

a second current source connected between the second switch and the another ground terminal; and a second comparator configured to compare an integration voltage of the integration node with a reference voltage, and correspondingly output the integration result signal, wherein the motor driving method further comprises configuring the control circuit to control magnitudes of the variable capacitor, the first current source, the second current source, or the reference voltage to control the integration time, and the first switch and the second switch are turned on and off based on the comparison result signal.

9. The motor driving method according to claim 7, wherein the integration circuit is an up-down counter having a clock terminal, an input terminal and an output terminal, wherein the motor driving method further comprises:

configuring the control circuit to control a counting speed of the up-down counter through the clock terminal to control the integration time; and configuring the up-down counter to receive the comparison result signal through the input terminal and perform counting to generate the integration result value, and output the integration result signal at the output terminal.

10. The motor driving method according to claim 6, wherein the second integration time is fixed.

* * * * *